(12) United States Patent
Adamczyk et al.

(10) Patent No.: US 12,184,149 B2
(45) Date of Patent: Dec. 31, 2024

(54) ELECTRIC MOTOR FOR A HANDHELD POWER TOOL

(71) Applicant: C. & E. Fein GmbH, Schwaebisch Gmuend-Bargau (DE)

(72) Inventors: Martin Adamczyk, Aalen (DE); Christoph Maier, Notzingen (DE); Rudi Brueckmann, Schwaebisch Gmuend (DE); Bernd Mayer, Ellwangen (DE); Tobias Hokenmaier, Rechberghausen (DE)

(73) Assignee: C. & E. FEIN GMBH, Schwaebisch Gmuend-Bargau (DE)

( * ) Notice: Subject to any disclaimer, the term of this patent is extended or adjusted under 35 U.S.C. 154(b) by 293 days.

(21) Appl. No.: 17/837,599

(22) Filed: Jun. 10, 2022

(65) Prior Publication Data

US 2022/0302791 A1    Sep. 22, 2022

Related U.S. Application Data

(63) Continuation of application No. PCT/EP2020/084932, filed on Dec. 7, 2020.

(30) Foreign Application Priority Data

Dec. 13, 2019    (DE) .................... 20 2019 106 968.6

(51) Int. Cl.
*H02K 5/18* (2006.01)
*H02K 5/15* (2006.01)
(Continued)

(52) U.S. Cl.
CPC ............... *H02K 5/18* (2013.01); *H02K 5/15* (2013.01); *H02K 5/1732* (2013.01); *H02K 7/145* (2013.01);
(Continued)

(58) Field of Classification Search
CPC . H02K 5/18; H02K 11/21; H02K 5/15; H02K 5/1732; H02K 7/145
See application file for complete search history.

(56) References Cited

U.S. PATENT DOCUMENTS 3,344,291 A     9/1967 Pratt
3,413,498 A *  11/1968 Bowen, III ............ H02K 7/145
                                                                  200/522

(Continued)

FOREIGN PATENT DOCUMENTS

AT          519371 A4     6/2018
CH          168506 A      4/1934
(Continued)

OTHER PUBLICATIONS

International Search Report dated Feb. 25, 2021 in corresponding application dated PCT/EP2020/084932.

(Continued)

*Primary Examiner* — Robert W Horn
(74) *Attorney, Agent, or Firm* — Muncy, Geissler, Olds & Lowe, P.C.

(57) ABSTRACT

An electric motor of an AC-operated, handheld power tool, with a stator that has multiple windings that are accommodated in a laminated stator core and are electrically insulated therefrom with basic insulation, in which stator a rotor is supported so as to be rotatable about an axis of rotation, wherein the rotor has a rotor shaft on which a laminated rotor core with a multiplicity of permanent magnets is held, which laminated rotor core is electrically insulated from the rotor shaft, characterized in that the stator is enclosed by a motor housing that is electrically insulated from the windings of the stator, and in that a supplementary electrical insulation is formed between the motor housing and the rotor shaft.

18 Claims, 3 Drawing Sheets

(51) Int. Cl.
    *H02K 5/173*     (2006.01)
    *H02K 7/14*     (2006.01)
    *H02K 9/06*     (2006.01)
    *H02K 11/21*     (2016.01)

(52) U.S. Cl.
    CPC ............... *H02K 9/06* (2013.01); *H02K 11/21* (2016.01); *H02K 2213/03* (2013.01)

(56) References Cited

U.S. PATENT DOCUMENTS

| | | | |
|---|---|---|---|
| 4,336,473 A * | 6/1982 | Wetters | H02K 7/08 |
| | | | 417/373 |
| 5,945,759 A | 8/1999 | Tanaka et al. | |
| 8,975,800 B2 | 3/2015 | Riedl et al. | |
| 10,312,766 B2 * | 6/2019 | Pokorny | H02K 7/083 |
| 11,025,144 B2 * | 6/2021 | Li | H02K 11/33 |
| 11,031,831 B2 * | 6/2021 | Oikawa | H02K 21/16 |
| 2002/0050762 A1 * | 5/2002 | Tang | H02K 7/003 |
| | | | 310/261.1 |
| 2004/0056537 A1 | 3/2004 | Du et al. | |
| 2017/0312902 A1 | 11/2017 | Noguchi et al. | |
| 2019/0099873 A1 | 4/2019 | Zhang et al. | |
| 2019/0273421 A1 | 9/2019 | Velderman et al. | |
| 2021/0135545 A1 | 5/2021 | Hellinger et al. | |
| 2022/0209602 A1 * | 6/2022 | Wilde | H02K 7/145 |
| 2022/0302791 A1 * | 9/2022 | Adamczyk | H02K 11/21 |
| 2023/0088074 A1 * | 3/2023 | Takahashi | H02K 7/08 |
| | | | 180/65.6 |
| 2024/0055938 A1 * | 2/2024 | Yazaki | F02B 63/042 |

FOREIGN PATENT DOCUMENTS

| | | |
|---|---|---|
| CH | 345262 A | 3/1960 |
| CN | 1307390 A | 8/2001 |
| CN | 202737600 U | 2/2013 |
| CN | 104377873 A | 2/2015 |
| DE | 102005022793 B3 | 6/2006 |
| DE | 102006045178 A1 | 4/2008 |
| DE | 102010031399 A1 | 1/2012 |
| DE | 102013227054 A1 | 6/2015 |
| DE | 112016006772 T5 | 1/2019 |
| DE | 102018110174 A1 | 10/2019 |
| EP | 1202437 A2 | 5/2002 |
| FR | 2164037 A5 | 7/1973 |
| GB | 2171853 A | 9/1986 |

OTHER PUBLICATIONS

International Preliminary Report on Patentability dated Jun. 23, 2022 in corresponding application PCT/EP2020/084932.

* cited by examiner

ELECTRIC MOTOR FOR A HANDHELD POWER TOOL

This nonprovisional application is a continuation of International Application No. PCT/EP2020/084932, which was filed on Dec. 7, 2020, and which claims priority to German Patent Application No. 20 2019 106 968.6, which was filed in Germany on Dec. 13, 2019, and which are both herein incorporated by reference.

BACKGROUND OF THE INVENTION

Field of the Invention

The present invention relates to an electric motor of an AC-operated, handheld power tool, with a stator that has multiple windings that are accommodated in a laminated stator core and are electrically insulated therefrom with basic insulation, in which stator a rotor is supported so as to be rotatable about an axis of rotation, wherein the rotor has a rotor shaft on which a laminated rotor core with a multiplicity of permanent magnets is held.

Description of the Background Art

Electric motors, which are also referred to as EC motors or as brushless, electronically commutated electric motors, have long been known from the prior art, for example from DE 10 2010 031 399 A1, which corresponds to US 2012/0014823. In these EC motors, which are commonly used in handheld or portable corded power tools, a rotating field, which drives the rotor, is generated in the stator through appropriate activation in order to thereby drive an insertable tool such as an abrasive disk. The basic insulation that electrically insulates the windings from the laminated stator core is customarily realized in this case by adherence to clearances and creepage distances, as well as by an electrically insulating material.

However, when these line-powered EC electric motors are used in handheld power tools during whose use electrically conductive metal dusts or particles arise, for example in the case of angle grinders in metal construction, the problem exists that, on account of the high line voltages, the risk of short circuits increases when these dusts or particles enter the handheld power tool, and after that the electric motor, with the cooling air. The danger then exists here that the electric motor may suffer a fault or that electric current may be transmitted through the rotor shaft to the housing, which would entail a risk of injury to the user.

SUMMARY OF THE INVENTION

It is therefore an object of the present invention to provide an electric motor that reduces the abovementioned disadvantages.

This object is attained according to an exemplary embodiment of the invention with an electric motor of the initially mentioned type by the means that the stator is enclosed by a motor housing that is electrically insulated from the windings of the stator, and that a supplementary electrical insulation is formed between the motor housing and the rotor shaft.

By means of the motor housing, which especially advantageously has an essentially hollow cylindrical basic shape, it is ensured in the case of an electric motor installed in a handheld power tool that, on the one hand, electrically conductive dusts and particles that typically appear during the working of metal workpieces cannot even get into the interior of the electric motor at all. Moreover, a double electrical insulation is provided by this means, achieving the result that the voltage-carrying parts of the electric motor installed in the handheld power tool—which is to say the windings of the stator, in particular—are insulated from the rotor shaft in such a manner that a maximum touch current of 0.5 mA can occur between these voltage-carrying parts of the motor and the rotor shaft, and thus the parts that can be touched by the user, such as the housing or the gear head. The operating voltage of the electric motor according to the invention is normally between 80 V and 280 V AC in this regard.

Consequently, the windings of the stator are double-insulated from the rotor shaft to the effect that the laminated rotor core is electrically insulated from the laminated stator core by the basic insulation of the windings, on the one hand, and on the other hand the laminated rotor core is secured on the rotor shaft by an electrical insulation that represents additional insulation, and is customarily realized through a potting or filling compound. Since the windings of the stator are already electrically insulated from the outer circumference of the laminated stator core, an electrical insulation of the motor housing from the rotor shaft is achieved by the supplementary insulation.

It has also been shown to be beneficial in this case when the supplementary insulation includes an electrically insulating bearing retaining sleeve in which the rotor shaft is accommodated. In this case, the bearing retaining sleeve, which preferably has a hollow cylindrical basic shape and further preferably is made of plastic, can, in particular, be inserted in an opening formed in the motor housing that is coaxial to the rotor shaft.

For supporting the rotor shaft, it has proven worthwhile in this case when the bearing retaining sleeve has a first bearing seat for a first bearing of the rotor shaft. The first bearing can be inserted in this first bearing seat in this case in order to support the rotor shaft so as to be rotatable relative to the motor housing and the stator. In this context, it has then proven advantageous when the bearing retaining sleeve has a radial rib on the inner circumferential side. By this means, a detent seat is ultimately defined into which the first bearing can be inserted in order to limit the insertion depth of the bearing. Within the scope of the invention, provision is also made here, however, that the bearing retaining sleeve is arranged directly on the rotor shaft. In this case, the first bearing is then arranged on the bearing retaining sleeve on the outer circumferential side between it and the motor housing. Alternatively, or in addition, the first bearing can also be designed as a current-insulating bearing, and thus serve as part of the supplementary insulation.

It has also been shown to be beneficial when the bearing retaining sleeve has a collar on the outer circumferential side. This collar delimits the axial insertion of the bearing retaining sleeve in the opening that is formed in the motor housing. In addition, an at least partial covering of the motor housing at the front is achieved herewith, which likewise has a positive effect on the insulating action of the bearing retaining sleeve. Moreover, the effect can also be achieved thereby that entry of dusts and/or particles into the motor housing is avoided or at least reduced. The outside diameter of the bearing retaining sleeve is smaller in this design than the inside diameter of the stator of the electric motor.

Additional electrical insulation is also achieved in that the supplementary insulation includes an end cap that delimits the motor housing in the axial direction. The end cap especially preferably can delimit the motor housing on the side that is axially opposite the bearing retaining sleeve. In this context, it has then proven especially beneficial when the end cap is made at least partially of an electrically insulating material. In this case, provision is also made, in particular, that the end cap is made entirely of an electrically insulating material, for example of plastic. Provision is also made within the scope of the invention, however, to make this end cap of metal and only partially of plastic, which permits improved heat removal. In particular, only the parts that are in contact with the rotor shaft can then be manufactured of plastic. In addition, provision is also made that cable lead-throughs with which connecting cables are routed into the motor housing are formed in the end cap. These cable lead-throughs preferably are then likewise electrically insulated from the motor housing. The diameter of the end cap is larger in this case than the diameter of the stator of the electric motor.

Assembly effort can be reduced when the end cap and the motor housing are connected to one another, preferably are detachably connected to one another. It is especially preferred in this case when the two components are screwed to one another, and when the screw connection is made parallel to the rotor axis. It has also proven especially worthwhile here when the screw connection is made from the end cap, which is to say when the threads that accommodate the screws are formed inside the motor housing. Provision is also made within the scope of the invention, however, that the end cap and the motor housing are connected to one another by a latching connection.

It has also proven advantageous when a second bearing seat, in which a second bearing of the rotor shaft is accommodated, is formed in the end cap. It is ensured by means of this second bearing that the rotor shaft is supported close to the laminated rotor core, which has a positive effect on the concentricity of the entire rotor. Alternatively, or in addition, the second bearing can also be designed as a current-insulating bearing, and thus serve as part of the supplementary insulation.

It has also proven beneficial, moreover, when a mounting flange, in which a part of a position sensor is accommodated for determining the rotational position of the rotor shaft, is formed in the end cap. Such position sensors in this case are customarily composed of a reed sensor and a magnet that advantageously is connected to the rotor in a rotationally fixed manner and is supported in a rotatable manner inside the mounting flange. This makes it possible to detect the current orientation of the rotor. In this design, the mounting flange essentially fulfills the function of further reducing or entirely preventing the entry of contaminants into the motor. Moreover, in this way a space-saving positioning of the magnet on the rotor shaft is made possible.

It has proven worthwhile, moreover, when the motor housing is matched to the stator in such a manner that a thermal contact of an inner wall of the motor housing and an outer wall of the stator is realized. In this way, it is ensured that the waste heat arising in the interior of the motor can be dissipated effectively through the motor housing. In this context, it has then proven advantageous when the motor housing is made of metal, since the waste heat can be carried away especially well by this means. Within the scope of the invention, it is also advantageous for heat removal when the stator with the motor housing is potted or filled by a thermally conductive material.

Heat dissipation can be further improved, moreover, by the means that cooling fins are associated with the motor housing on the outer circumferential side, wherein it has then also proven worthwhile in this context when the ratio of the diameter of the motor housing to the height of the cooling fins is preferably 2:1 or greater, preferentially 4:1 or greater and especially preferentially 8:1 or greater, and further preferably 15:1 or less, preferentially 12:1 or less, and especially preferentially 10:1 or less. In this way, a good compromise is ultimately made between a compact construction of the motor and adequate cooling.

It has then also proven especially beneficial, however, when the cooling fins are arranged radially and their radially outer ends have a constant distance from the axis of rotation of the rotor. In particular, this has the advantage during installation of the electric motor according to the invention in a handheld power tool that the motor has an essentially uniform diameter in the region of the cooling fins.

It has also proven advantageous when a contact face, in which a heat-conducting ring is accommodated, is formed in the motor housing. The contact face preferably is formed in a plane that is perpendicular to the axis of rotation in this case. By means of the heat-conducting ring, which can also be provided multiple times, in particular can also be provided in an axially staggered manner, it is then possible to carry away the waste heat of the stator at the front. In this context, it has then also proven worthwhile when the heat-conducting ring is designed to be elastically deformable. This achieves the result that the heat-conducting ring, which can also be provided multiple times, in particular can also be provided in an axially staggered manner, is compressed during insertion of the stator in the motor housing, by which means the connection to the winding, and thus the heat removal, is benefited further. Moreover, this has a positive effect on the axial preloading of the stator in the motor housing when the electric motor is installed in the handheld power tool. Moreover, axial play that may be present within the motor can also be reduced by this means.

In order to carry the waste heat arising during use of the electric motor away radially to the outside to the motor housing especially effectively, it has also proven especially beneficial when an auxiliary fan is arranged on the rotor shaft inside the electric motor. This auxiliary fan then moves at least some of the waste heat radially to the outside, where it is emitted through the motor housing and can then be moved out of the handheld power tool by a main fan. The auxiliary fan is arranged inside the motor housing in this case, and consequently is protected especially well from contaminants. It has proven especially worthwhile within the scope of the invention in this case when the auxiliary fan is arranged between the second bearing and the laminated rotor core. Heat removal is further benefited by the arrangement of the auxiliary fan in the region of the end cap.

Provision is alternatively or additionally made within the scope of the invention that the supplementary insulation is realized through an insulation arranged on the rotor shaft. This can be achieved through a potting compound or through a sleeve arranged on the outer circumference of the rotor shaft, for example.

The subject matter of the present invention is additionally a handheld power tool, in particular a grinding tool for working workpieces, having a housing in which an electric motor is accommodated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
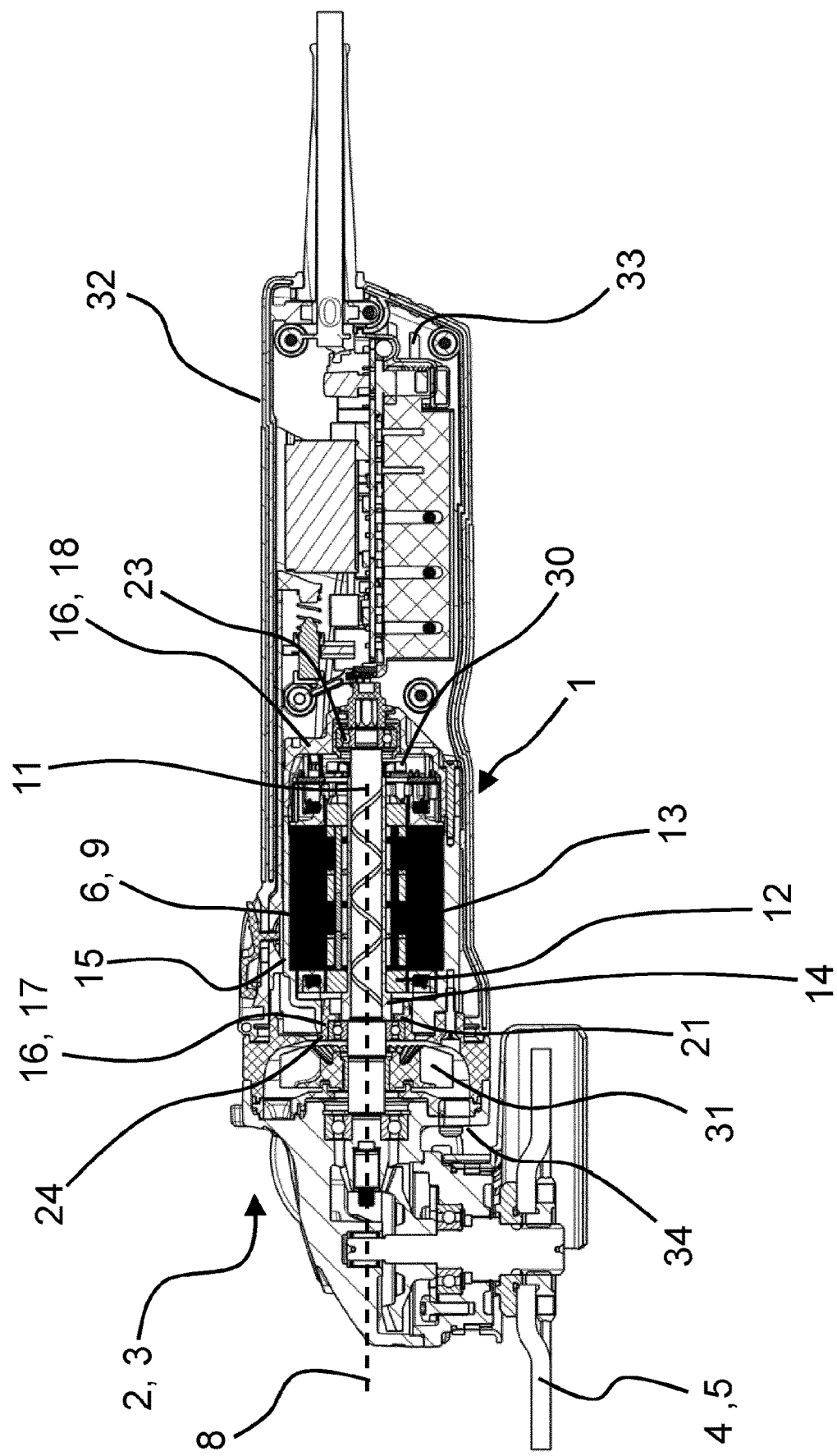
FIG. 1 is a sectional view of a handheld power tool with an electric motor according to the invention.

FIG. 1 shows, in a sectional view along a longitudinal section, an electric motor 1 of a corded handheld power tool 2, which in the exemplary embodiment shown is implemented as an angle grinder 3, which customarily is operated with voltages between 80 V and 280 V. The electric motor 1 of the handheld power tool 2 is designed as an EC motor and drives an insertable tool 4, which in the present case is implemented as an abrasive disk 5. The electric motor 1 includes a stator 6 and a rotor 7 that is supported within the stator 6 so as to be rotatable about an axis 8 of rotation. The stator 6 in this case includes multiple windings 9, which are supplied with voltage through lines. The windings 9 in this design are accommodated in a laminated stator core 10 and are electrically insulated therefrom with basic insulation. This is achieved by the means that the clearances and creepage distances are adhered to, and that the windings 9 are separated from the laminated stator core 10 by an electrically insulating material. The rotor 7 in this design includes a rotor shaft 11 on which is held a laminated rotor core 12 with a multiplicity of permanent magnets 13. Through appropriate activation of the windings 9 in the stator 6, a rotating field is generated in the stator 6, which drives the rotor 7 and thereby makes it possible to drive an insertable tool 4 that is connected to the rotor 7. In the exemplary embodiment shown, the laminated rotor core 12 is potted with the rotor shaft 11 by an insulating material 14, and is electrically insulated therefrom as a result. In order to prevent or at least to reduce an entry of contaminants, such as electrically conductive dusts or particles, into the interior of the electric motor 1, the stator 6 is enclosed by a motor housing 15. In this case, the motor housing 15 is electrically insulated from the windings 9 of the stator 6 in order to prevent the motor housing 15 from carrying a voltage. As is evident from FIG. 2, in particular, this is achieved in the exemplary embodiment shown in that at least the outer circumference of the region of the stator 6, which includes the windings 9, is likewise enclosed by an electrically insulating material 14. In order to realize double insulation between the stator 6 and the rotor 7, a supplementary electrical insulation 16 is formed between the motor housing 15, which has an essentially hollow cylindrical shape, and the rotor shaft 11. This supplementary insulation 16 is divided into two parts in this case, and includes a bearing retaining sleeve 17, which is arranged on the end of the motor housing 15 facing toward the insertable tool 4, and an end cap 18, which is arranged on the end of the motor housing 15 facing away from the insertable tool 4. In addition to electrically insulating the motor housing 15 from the rotor 7, the bearing retaining sleeve 17 and the end cap 18 each also accommodate a support for the rotor shaft 11 at the same time. For this purpose, the bearing retaining sleeve 17 has a first bearing seat 19 for a first bearing 20 of the rotor shaft 11. This first bearing seat 19 is axially delimited in this case by a radial rib 21 formed on the bearing retaining sleeve 17 on the inner circumferential side, by which means assembly is facilitated. A second bearing seat 22, in which a second bearing 23 of the rotor shaft 11 is accommodated, is formed in the end cap 18. In order to achieve electrical insulation between the rotor shaft 11 and the motor housing 15, the end cap 18 and the bearing retaining sleeve 17 are made at least partially of an electrically insulating material such as plastic. Consequently, the windings 9 of the stator 6 are each double insulated from the rotor shaft 11. As already described, the windings 9 and the laminated rotor core 12 are insulated from one another, which is achieved by the basic insulation of the windings 9 from the laminated stator core 10. In addition, the second insulation, also referred to as supplementary insulation, is provided by the nonconductive insulating material 14 between the laminated rotor core 12 and the rotor shaft 11. Since the windings 9 within the stator 6 are likewise potted by the nonconductive insulating material 14, this insulating material 14 forms the basic insulation between the stator 6 and the motor housing 15. Arranged between the motor housing 15 and the rotor shaft 11, then, are the bearing retaining sleeve 17 and the end cap 18, which form the supplementary insulation 16 and electrically separate the rotor shaft 11 from the motor housing 15. In addition, it is evident from FIG. 1 that a main fan 31 is arranged on the rotor shaft 11 outside of the motor housing 15, which main fan draws cooling air from an air inlet 33 formed in a tool housing 32, directs this air along the outside of the motor housing 15 of the electric motor 1, and then guides it out of the tool housing 32 again through an air outlet 34.

Figure 2:
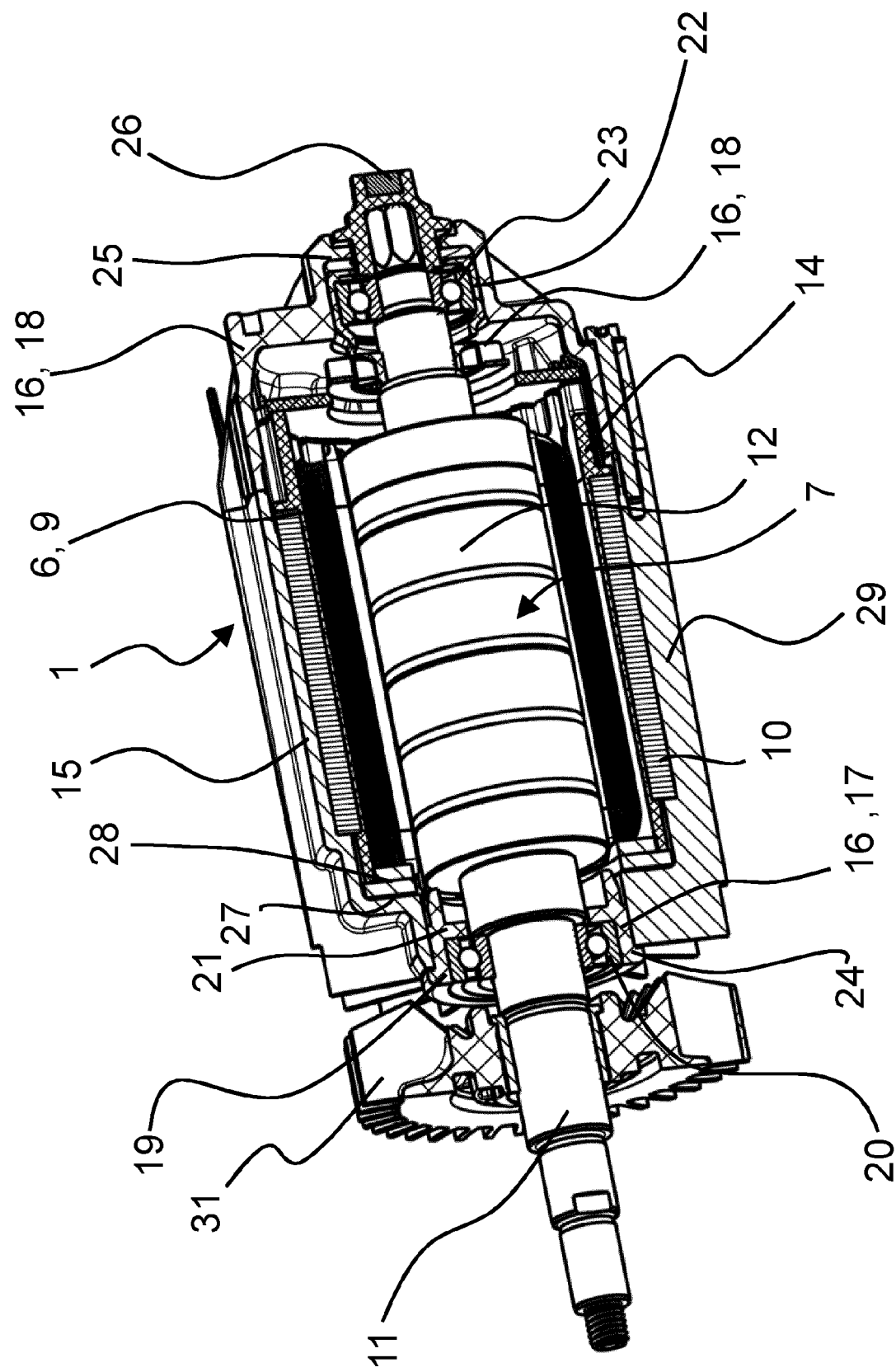
FIG. 2 is a partially sectional, perspective view of the electric motor.

It is evident from the partially sectional view of the electric motor 1 shown in FIG. 2, in particular, that the bearing retaining sleeve 17 has, on the outer circumferential side, a collar 24 that delimits the axial position of the bearing retaining sleeve 17 in the motor housing 15. As can additionally be seen in FIG. 2, a mounting flange 25 is formed in the end cap 18, and a magnet 26 that is connected to the rotor shaft 11 in a rotationally fixed manner and that is part of a position sensor is inserted in the mounting flange for the purpose of determining the rotational position of the rotor shaft 11. With the aid of a reed sensor, it is possible to detect the rotational position of the rotor 7 therewith. Moreover, the design of the mounting flange 25 achieves the result that electrically conductive particles and/or dusts cannot get into the interior of the electric motor 1. Additionally formed in the motor housing 15 is a contact face 27, which is adjoined by a heat-conducting ring 28 that is elastically deformable. This has the advantage during assembly, in particular, that the end face of the stator 6 can slightly compress the heat-conducting ring 28, thereby minimizing axial play that may be present. In order to reduce the radial play, the motor housing 15 is matched to the stator 6 so that, in particular, thermal contact of an inner wall of the motor housing 15 and an outer wall of the stator 6 is realized, by which means the waste heat of the electric motor 1 can be carried away through the motor housing 15. In addition, it is also evident from FIG. 2 that the end cap 18 and the motor housing 15 are screwed to one another, wherein the screw connection is made from the end cap 18. Since the electric motor 1 is encapsulated by the motor housing 15 and the supplementary insulation 16 composed of the bearing retaining sleeve 17 and the end cap 18, the waste heat that arises essentially is carried away exclusively through the motor housing 15, which is made of metal for this reason. In order to carry the waste heat arising within the electric motor 1 radially outward to the motor housing 15, an auxiliary fan 30 is arranged within the motor housing 15, namely between the second bearing 23 and the laminated rotor core 12.

Figure 3:
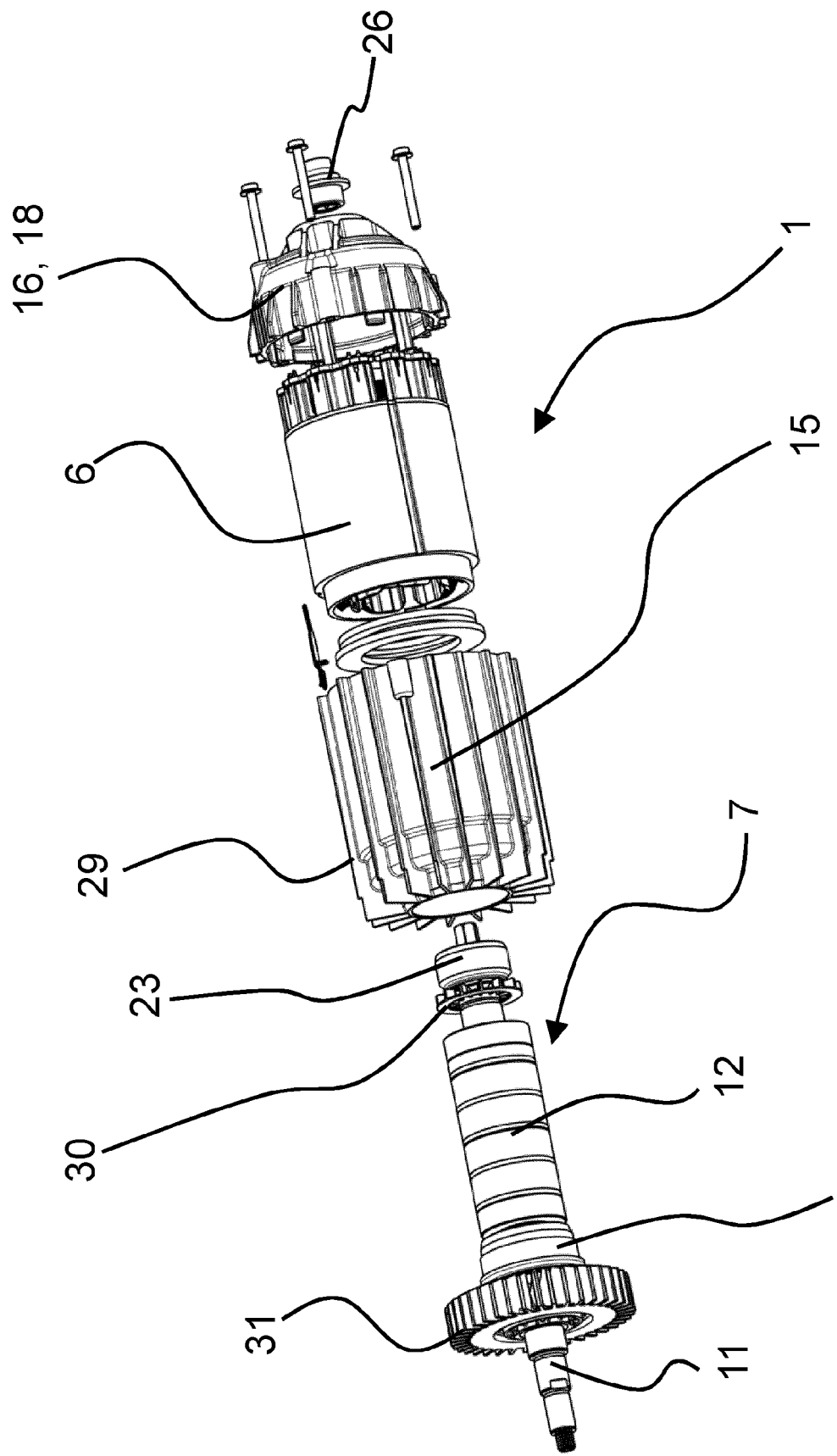
FIG. 3 is an exploded view of the electric motor.

FIG. 3 shows the electric motor 1 in an exploded view. It is evident from this that cooling fins 29 are associated with the motor housing 15, which is made of metal, on the outer circumferential side in order to improve cooling performance. The ratio of the diameter of the motor housing 15 to the height of the cooling fins 29 in the exemplary embodiment shown is preferably 2:1 or greater, preferentially 4:1 or greater, and especially preferentially 8:1 or greater, and further preferably 15:1 or less, preferentially 12:1 or less, and especially preferentially 10:1 or less. The cooling fins 29 in this case are arranged facing radially outward on the motor housing 15, and the radially outer ends of the cooling fins 29 have an essentially constant distance from the axis 8 of rotation of the rotor 7.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric motor of an AC-operated handheld power tool, the electric motor comprising:
    a stator that has a plurality of windings that are accommodated in a laminated stator core and are electrically insulated therefrom with insulation; and
    a rotor supported in the stator so as to be rotatable about an axis of rotation, the rotor having a rotor shaft on which a laminated rotor core with at least two permanent magnets is held,
    wherein the laminated rotor core is electrically insulated from the rotor shaft,
    wherein the stator is enclosed by a motor housing that is electrically insulated from the windings of the stator,
    wherein a supplementary electrical insulation is formed between the motor housing and the rotor shaft,
    wherein the supplementary electrical insulation includes an electrically insulating bearing retaining sleeve in which the rotor shaft is accommodated, and
    wherein the bearing retaining sleeve has a radial rib on an inner circumferential side, such that the radial rib protrudes inward from an inner circumferential surface of the bearing retaining sleeve in a direction towards the rotor shaft.

2. The electric motor according to claim 1, wherein the bearing retaining sleeve has a first bearing seat for a first bearing of the rotor shaft, such that the first bearing is accommodated inside of the bearing retaining sleeve.

3. The electric motor according to claim 1, wherein the bearing retaining sleeve has a collar on an outer circumferential side.

4. The electric motor according to claim 1, wherein the supplementary electrical insulation includes an end cap that delimits the motor housing in an axial direction.

5. The electric motor according to claim 4, wherein the end cap is made at least partially of an electrically insulating material.

6. The electric motor according to claim 4, wherein the end cap and the motor housing are connected to one another or are detachably connected to one another.

7. The electric motor according to claim 6, wherein the supplementary electrical insulation includes an electrically insulating bearing retaining sleeve in which the rotor shaft is accommodated, wherein the bearing retaining sleeve has a first bearing seat for a first bearing of the rotor shaft, and wherein a second bearing seat, in which a second bearing of the rotor shaft is accommodated, is formed in the end cap.

8. The electric motor according to claim 1, wherein the motor housing is matched to the stator such that a thermal contact of an inner wall of the motor housing and an outer wall of the stator is realized.

9. The electric motor according to claim 1, wherein the motor housing is made of metal.

10. The electric motor according to claim 1, wherein cooling fins are associated with the motor housing on an outer circumferential side.

11. The electric motor according to claim 10, wherein a ratio of a diameter of the motor housing to a height of the cooling fins is 2:1 to 15:1.

12. The electric motor according to claim 10, wherein the cooling fins are arranged radially, and radially outer ends of the cooling fins have a constant distance from the axis of rotation of the rotor.

13. The electric motor according to claim 1, wherein a contact face, in which a heat-conducting ring is accommodated, is formed in the motor housing.

14. The electric motor according to claim 1, wherein an auxiliary fan is arranged on the rotor shaft inside the electric motor.

15. The electric motor according to claim 1, wherein the supplementary electrical insulation is an insulation arranged on the rotor shaft.

16. A handheld electric power tool or a grinding tool for working workpieces comprising a housing in which the electric motor according to claim 1 is accommodated.

17. An electric motor of an AC-operated handheld power tool, the electric motor comprising:
    a stator that has a plurality of windings that are accommodated in a laminated stator core and are electrically insulated therefrom with insulation; and
    a rotor supported in the stator so as to be rotatable about an axis of rotation, the rotor having a rotor shaft on which a laminated rotor core with at least two permanent magnets is held,
    wherein the laminated rotor core is electrically insulated from the rotor shaft,
    wherein the stator is enclosed by a motor housing that is electrically insulated from the windings of the stator,
    wherein a supplementary electrical insulation is formed between the motor housing and the rotor shaft,
    wherein the supplementary electrical insulation includes an end cap that delimits the motor housing in an axial direction, and
    wherein a mounting flange, in which a part of a position sensor is accommodated for determining a rotational position of the rotor shaft, is formed in the end cap.

18. An electric motor of an AC-operated handheld power tool, the electric motor comprising:
    a stator that has a plurality of windings that are accommodated in a laminated stator core and are electrically insulated therefrom with insulation; and
    a rotor supported in the stator so as to be rotatable about an axis of rotation, the rotor having a rotor shaft on which a laminated rotor core with at least two permanent magnets is held,
    wherein the laminated rotor core is electrically insulated from the rotor shaft, wherein the stator is enclosed by a motor housing that is electrically insulated from the windings of the stator,
wherein a supplementary electrical insulation is formed between the motor housing and the rotor shaft
wherein a contact face, in which a heat-conducting ring is accommodated, is formed in the motor housing, and
wherein the heat-conducting ring is elastically deformable.

* * * * *